(No Model.)
F. L. MORHARD.
DENTAL ELECTRODE.
No. 592,878. Patented Nov. 2, 1897.
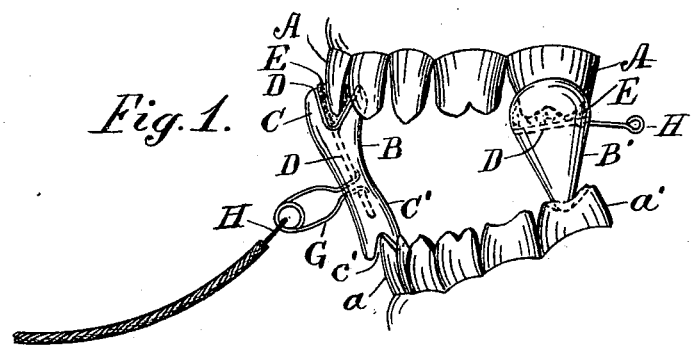
Fig. 1.
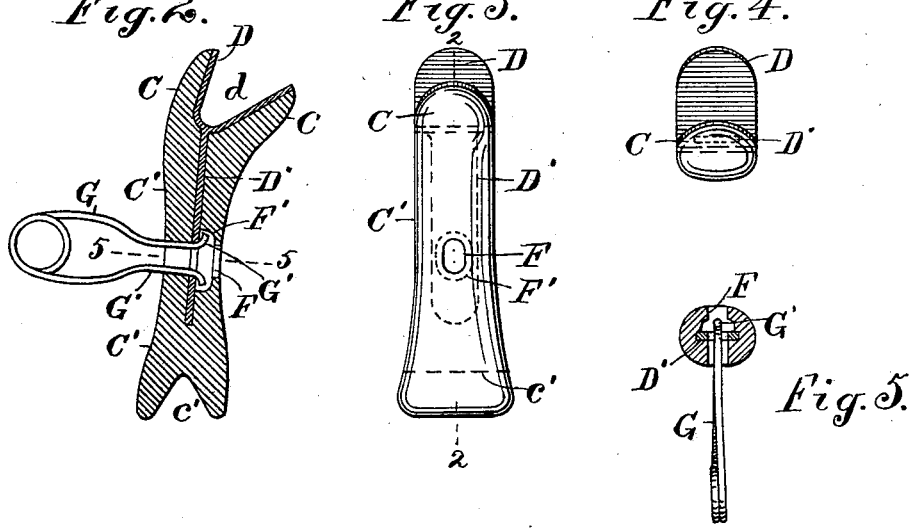
Fig. 2. Fig. 3. Fig. 4.
Fig. 5.
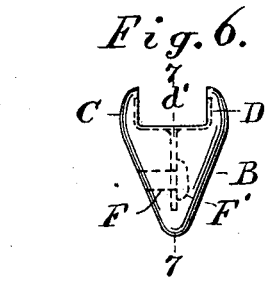 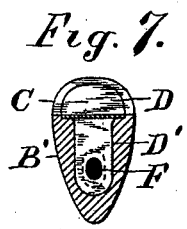 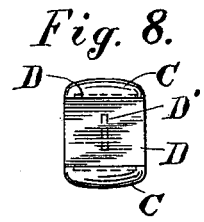
Fig. 6. Fig. 7. Fig. 8.
Attest:
L. Lee.
Edw. F. Kinsey
Inventor.
Francis L. Morhard,
per Thomas S. Crane, Atty.

UNITED STATES PATENT OFFICE.

FRANCIS L. MORHARD, OF NEW YORK, N. Y.

DENTAL ELECTRODE.

SPECIFICATION forming part of Letters Patent No. 592,878, dated November 2, 1897.

Application filed March 1, 1897. Serial No. 625,542. (No model.)

*To all whom it may concern:*

Be it known that I, FRANCIS L. MORHARD, a citizen of the United States, residing at New York, county of New York, State of New York, have invented certain new and useful Improvements in Electrodes for Adaptation of Cataphoresis in Dentistry, fully described and represented in the following specification and the accompanying drawings, forming a part of the same.

The object of this invention is to facilitate the diffusion of cocaine and analogous local anesthetics through the bony substance of a tooth to render it insensible during dental operations, the invention thus being an adaptation of cataphoresis to the teeth.

The invention consists, primarily, of a pocket of conducting material adapted to hold the anesthetic or a pad charged with the same in contact with the tooth to be treated, an electric connection to such conducting-pocket, and an insulating-shank adapted for contact with the opposite jaw or tooth. By this construction the natural tension of the muscles upon the patient's jaw serves to hold the pocket with the anesthetic securely in the desired position while the operator applies and regulates the electric current. The conducting-pocket is preferably attached to the shank by a metallic core, and the electric connection is made by a perforation extending through the side of the shank into such core. The shank is made of suitable length to fit comfortably between the teeth of the upper and lower jaw, and its extremity opposite to the pocket is shaped to fit the crown of the opposite tooth upon which it is supported.

The pocket upon the instrument is made of various shapes and sizes adapted to press the anesthetic-pad in contact with the incisor, canine, bicuspid, or molar teeth, the extremity of the shank being tapered or nearly pointed for support upon the molar teeth and cleft or notched for application to the cusps of other teeth.

In the annexed drawings the proportions of the parts are exaggerated to represent the construction clearly, and the illustrations show an electrode adapted for application to an incisor and also to a molar tooth.

Figure 1 shows a portion of the teeth upon the upper and lower jaw with the implement applied to the incisors and to the first molar tooth. Figs. 2, 3, 4, and 5 illustrate the incisor-electrode drawn twice the size of that shown in Fig. 1 to exhibit the construction clearly, Fig. 2 being a longitudinal section on line 2 2 in Fig. 3, which latter is a front elevation. Fig. 4 is a plan looking down upon the top of the electrode as shown in Fig. 3, and Fig. 5 is a cross-section on line 5 5 in Fig. 2. Figs. 6, 7, and 8 illustrate the molar-electrode, Fig. 6 being an edge view, Fig. 7 a longitudinal section on line 7 7 in Fig. 6, and Fig. 8 being a plan showing the bottom of the pocket.

A designates the incisor tooth to which the incisor-electrode B is applied in Fig. 1, and A' designates the molar tooth to which the molar-electrode B' is applied in the same figure. The electrode B is formed with angular jaws C, having a metallic lining D fitted thereto and forming pocket $d$ to support the pad E, which holds the cocaine or similar anesthetic in contact with the tooth. The jaws C and shank C' are formed of insulating material, as vulcanite, celluloid, or other suitable material, and the shank is shown with cleft $c'$ at the bottom to fit upon the crown of the lower incisor $a$. The jaws are shown of angular shape upon the electrode B to press the pad upon the inner and outer sides of the incisor A, and a metallic cord D' is extended from the lining D downward inside the shank, and both shank and core are shown in Figs. 2 and 5 with coincident perforations F.

A chamber F' is formed within the shank upon the inner side of the core, and spring-arms G are shown extended through the outer perforation, with bent ends G' to spring outwardly into such chamber and lock the arms therein.

An electric conductor H is shown in Fig. 1 connected with the spring-arms, and the current is thus carried through the arms D' and lining D to the pad E and tooth A.

The molar-electrode B' is shown in Fig. 1, with a wire eye H' secured directly to the pocket-lining D, and the application of the electric conductor H to such eye serves to carry the current to the pad E and tooth A' without requiring a core to be extended from such lining into the shank. A molar-electrode is, however, shown in Figs. 6, 7, and 8 provided with the core to admit the electric conductor, as already described. The pocket lettered $d'$ in this electrode is shown of rectangular shape with parallel sides, and the pad D is shown placed therein in a suitable position to press upon the crown of a molar. The end of the shank opposite the pocket is tapered to a rounded point adapted to rest in a hollowed crown of a molar, as shown at $a'$ in Fig. 1. The means for connecting the conductor H detachably to the electrode is immaterial, and it is obvious that the core itself may be extended through the side of the electrode and provided at its extremity with suitable means to engage the conductor; but the core itself is wholly protected from injury by its inclosure in the body of the shank, as shown in the drawings.

In Figs. 6, 7, and 8 the metallic lining D of the pocket is shown smaller in all its dimensions than the jaws C, and is thus wholly surrounded at its edges by the insulating material and guarded from accidental contact with the lips or any other part of the mouth.

The spring-arms G and their connections with the electric conductor H may be readily coated with insulating material, and any contact of the conducting materials with the lips may thus be avoided. The shape of the pocket and of the shank is materially different in the two electrodes illustrated, and it will be obvious that any other shape may be employed, provided the pocket is formed or lined with conducting material and adapted to press the pad upon the crown of the tooth and the shank be formed of insulating material and adapted to rest upon the opposite tooth. The shape is not, therefore, material nor the means by which the electric current is conducted to the lining of the pocket.

The cleft upon the electrode B and the point upon the electrode B' serve equally to engage the crown of a tooth and to prevent the electrode from slipping; but such engagement is obviously not essential, as the pressure of the opposite tooth would suffice to hold the electrode in place if the end of the latter were made with a flat or roughened surface. A form adapted for engagement with the crown of the tooth is preferable, and I have therefore made a special claim to such form.

The essential feature of the invention is the conductor having a pocket to hold the anesthetic against the tooth under treatment and a non-connecting shank adapted for contact with the opposite tooth or jaw.

What I claim as my invention is—

1. In a dental electrode, the combination, with a conductor having a pocket to hold the anesthetic, of a non-conducting shank adapted for contact with the opposite jaw or tooth.

2. In a dental electrode, the combination, with a conductor having a pocket to hold the anesthetic in contact with a tooth upon one jaw, of a non-conducting shank formed at the end opposite the conductor to engage one of the opposite teeth.

3. In a dental electrode, the combination, with a conducting-pocket to hold the anesthetic in contact with a tooth upon one jaw, of a non-conducting shank adapted to contact with the opposite tooth or jaw, and a conducting-core extended from the pocket within the shank, and means for connecting an electric conductor detachably to such core.

4. In a dental electrode, the combination, with a non-conducting shank having cleft at one end and angular jaws at the opposite end, of a metallic lining fitted to such jaws and means for connecting an electric conductor detachably to such lining.

5. In a dental electrode, the combination, with a non-conducting shank having jaws with a metallic lining forming a conducting-pocket as set forth, of a metallic core extended from such lining within the shank, and a perforation in the side of the shank to admit a detachable conductor to such core.

6. In a dental electrode, the combination, with a non-conducting shank having jaws with a metallic lining forming a conducting-pocket as set forth, of a metallic core extended from such lining within the shank, coincident perforations in the core and in the shank, and a spring-contact adapted to fit within such perforation to connect an electric conductor detachably with the core, substantially as herein set forth.

7. In a dental electrode, the combination, with a non-conducting shank having jaws with a metallic lining forming a conducting-pocket as set forth, of a metallic core extended from such lining within the shank, coincident perforations in the core and in the shank with chamber in the shank adjacent to the perforation in the core, and spring-arms having teeth at the ends adapted, when placed within the perforation, to expand into the chamber to retain the arms therein, substantially as herein set forth.

8. An electrode for adaptation for cataphoresis in dentistry, comprising a metallic pocket to retain the anesthetic, with a metallic core extended from the bottom of the same, and a body of insulating material inclosing the entire core, outer walls, and edges of such metallic pocket and forming a shank for contact with the tooth or jaw, the conducting parts being thus wholly surrounded and guarded by the insulating material, as and for the purpose set forth.

In testimony whereof I have hereunto set my hand in the presence of two subscribing witnesses.

FRANCIS L. MORHARD.

Witnesses:
A. B. CROWE,
WM. F. WENGENROTH.